July 4, 1944.  R. H. TURNER  2,352,923

PROTECTIVE STRUCTURE FOR MIRRORS

Filed June 15, 1943

Inventor
Richard H. Turner
By Richmond I. Hayes
Attorney

Patented July 4, 1944

2,352,923

UNITED STATES PATENT OFFICE 2,352,923

PROTECTIVE STRUCTURE FOR MIRRORS

Richard H. Turner, Falconer, N. Y., assignor to Falconer Plate Glass Corporation, Falconer, N. Y., a corporation of New York Application June 15, 1943, Serial No. 490,861

1 Claim. (Cl. 88—105)

This invention relates to mirrors and particularly to a protective structure therefor.

In the use of panel glass, personal danger and injury have always been of much concern, particularly where the circumstances of usage were such that breakage might occur. This is due to the fact that glass, when subjected to strain or sharp blows, tends to shatter and many large and small particles scatter, frequently with considerable force. To overcome such objection in use, light glass was made non-shatterable by forming it from several layers suitably bonded together by a transparent adhesive. Such multi-layered glass, while substantially shatter-proof and entirely suitable for many purposes, is not generally usable as mirror glass. Thus, when it is contemplated to provide a mirror glass that will not shatter, a problem different from that of light glass is confronted. It has been considered that heavy or thick plate glass would be less susceptible to breakage and shattering than a thinner glass, not only because of being more substantial, but also because it was possible to so temper this glass as to render it less susceptible to shattering when broken.

There are many instances where thick or heavy plate mirror glass is not desirable, and a considerably thinner glass is used by reason of its being of less weight and requiring a less substantial mounting and support. More particularly, thin mirror glass is required in places where space and weight are a prime consideration and, at the same time, danger of breakage is great. For example, in the small quarters of many types of naval vessels, light weight mirrors must be mounted in small and compact wardrobe units or the like.

It is a purpose and object of the present invention to provide a mounting or support for a thin glass mirror that will serve to prevent the mirror from shattering or exploding when broken. It is also a purpose of the invention to protect thin mirror glass against shattering without requiring treatment of the glass, such as tempering, this being considered necessary in connection with the use of heavy or thick plate glass. Additionally it is a purpose of the invention to provide mirror glass with a flexible, non-hardening backing which will be permanently adhered thereto and serve to prevent broken particles of glass from flying. And it is also a purpose of the invention to provide a shatter-proof mirror with conventional mirror glass at extremely low cost.

Figure 1:
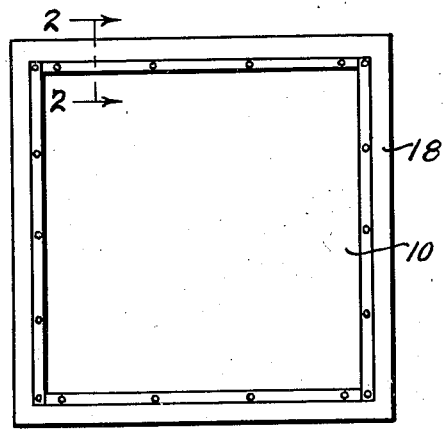
Figures 2, 3:
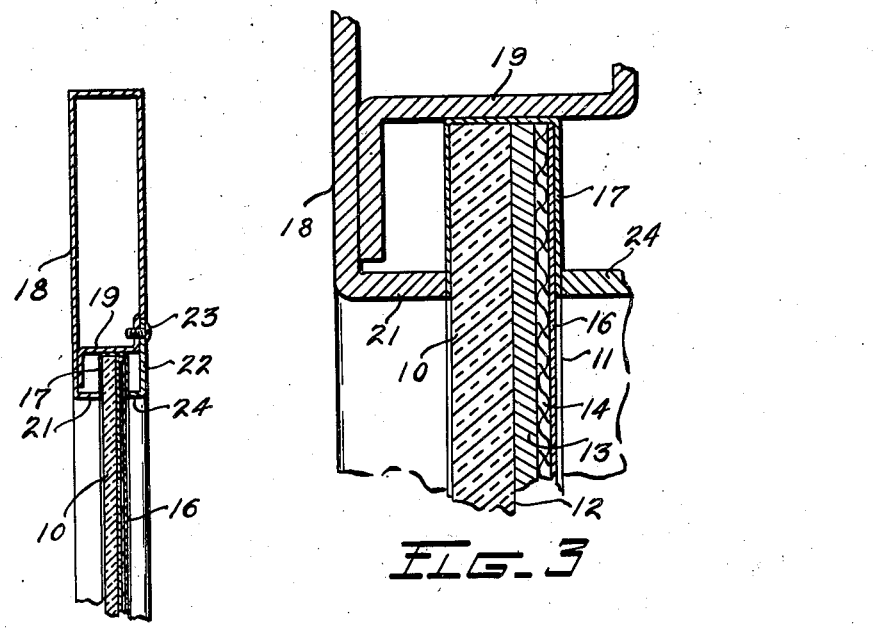

Other purposes and objects of the invention may be more fully understood from a consideration of the following specification, taken in conjunction with the accompanying drawing; and in which Fig. 1 is a rear elevational view of a framed mirror in which is embodied one form of the invention;

Fig. 2 is an enlarged fragmentary vertical sectional view taken substantially on the line 2—2 of Fig. 1 and shows one form of frame structure in which a mirror embodying the invention may be mounted; and Fig. 3 is a greatly enlarged view of a portion of the sectioned mirror and backing shown in Fig. 2.

It is well known that any single thickness glass, when subjected to a twisting or surface force, will break with the force of an explosion and particles of glass will be thrown with considerable force in all directions. It is evident, however, that if the glass, in its entirety, is permamently bonded to a material that will not break when subjected to a twisting or surface force by reason of its being sufficiently flexible to yield to the force, that the glass will not snap or break as it would if unsupported, nor will it be thrown about because of its being bonded to an unbroken backing or support. In the present illustration of the invention, a mirror glass 10 is shown provided with a flexible backing 11. Certain of the figures of the drawing show the glass greatly enlarged solely for the purpose of disclosing the relative thickness and position of the composite layers of backing 11, and it will be understood that the relative thickness of the glass to the backing is merely for purposes of illustration.

After the glass panel 10 has been silvered on one face 12 and a conventional protective coating applied thereto, this surface is coated with a non-hardening material 13, such as an asphalt mastic. The material 13 is applied in sufficient thickness to produce a heavy coating on the surface 12 in order that when a sheet 14 of fabric, such for example as canvas, is applied thereto under slight pressure, the mastic will in part be forced into the interstices of the fabric, but will yet provide a layer or coating between the surface 12 and sheet 14. Since the mastic is of a nature that it may stain or spot materials with which it comes in contact, a non-porous sheet 16 is applied to the canvas and is readily bonded thereto by the penetrated mastic. This strip 16 may be in the nature of a waxed paper. It is evident that except for the edges of the mirror, the backing 11 may not readily be dislodged, and to protect such edges against peeling of the sheet 16 and canvas 14, a suitable binder strip 17 is applied to the mirror edge and may be of such width as to be folded onto and firmly adhered to the front and rear mirror surfaces. It is not intended that the binder strip 17 be utilized as a frame, although under certain circumstances and with an ornamental binder, this might prove entirely satisfactory.

In the present disclosure the mirror is mounted in a frame 18, being in abutment with flanges 19 of the frame rails and located centrally of the frame depth by the fixed flange 21. Removable strips 22, secured to the frame as by screws 23, each include a flange 24 that holds the mirror in abutment with the previously referred to frame flanges 21. It may be that the material 13 overruns the glass edge, on application of the canvas 14, or is intentionally applied to such edge. In either case the binder strip covers this material. The binder strip serves as a cushion for the glass, not only with respect to flange 19, but also with respect to flange 24. Additionally, the binder strip is contacted by the flange 21. Thus, this strip serves not only to protect the edges of the backing 11 prior to mounting a mirror, but may also serve as a cushion with which any frame supports or clamps may be engaged.

From the foregoing, it will be evident that a mirror, to which a backing of the nature above described has been applied, is provided with a cushion-like backing that is always flexible. Should the mirror be broken the mastic serves as an adhesive as between the broken particles of glass and the canvas 14, and by reason of which the glass cannot fly and injure anyone in close proximity therewith at the time of breakage.

Although applicant has shown and described a backing for a mirror by which to render it shatter-proof in case of breakage, it will be understood that the thickness of the adhesive mastic, texture and thickness of the canvas and protective strip may be varied as required, and is within contemplation of the invention insofar as such variance may be within the spirit and scope of the annexed claim.

Having thus set forth my invention what I claim as new and for which I desire protection by Letters Patent is:

A protective backing for a mirror comprising a coating of a non-hardening material covering the entire back of said mirror, a layer of fabric, said fabric being applied under pressure sufficient to cause penetration of the material to the other surface thereof, a backing sheet bonded to said fabric by the penetrated material, and a binder strip adhered to the edges of said mirror and having a portion overlapping and adhered to the edge portion of said backing sheet.

RICHARD H. TURNER.